United States Patent
Tzur

(10) Patent No.: US 9,501,834 B2
(45) Date of Patent: Nov. 22, 2016

(54) IMAGE CAPTURE FOR LATER REFOCUSING OR FOCUS-MANIPULATION

(75) Inventor: Meir Tzur, Haifa (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 696 days.

(21) Appl. No.: 13/346,602

(22) Filed: Jan. 9, 2012

(65) Prior Publication Data

US 2013/0044254 A1 Feb. 21, 2013

Related U.S. Application Data

(60) Provisional application No. 61/525,102, filed on Aug. 18, 2011.

(51) Int. Cl.
  *H04N 5/232* (2006.01)
  *G06T 7/00* (2006.01)
  (Continued)

(52) U.S. Cl.
  CPC ......... *G06T 7/0069* (2013.01); *G02B 27/0075* (2013.01); *G06T 5/50* (2013.01);
  (Continued)

(58) Field of Classification Search
  CPC ............ G02B 27/0075; G06T 2200/21; G06T 2207/10148; G06T 2207/20221; G06T 5/50
  (Continued)

(56) References Cited

U.S. PATENT DOCUMENTS

| 4,804,831 A | 2/1989 | Baba et al. |
| 4,933,700 A | 6/1990 | Ikeda et al. |

(Continued)

FOREIGN PATENT DOCUMENTS

| JP | S62284314 A | 12/1987 |
| JP | S63127217 A | 5/1988 |

(Continued)

OTHER PUBLICATIONS

Search Report for British Patent Application No. GB1214349.1 mailed Dec. 4, 2012.

(Continued)

*Primary Examiner* — Amy Hsu
(74) *Attorney, Agent, or Firm* — Knobbe Martens Olson & Bear LLP

(57) ABSTRACT

A system, method, and computer program product for capturing images for later refocusing. Embodiments estimate a distance map for a scene, determine a number of principal depths, capture a set of images, with each image focused at one of the principal depths, and process captured images to produce an output image. The scene is divided into regions, and the depth map represents region depths corresponding to a particular focus step. Entries having a specific focus step value are placed into a histogram, and depths having the most entries are selected as the principal depths. Embodiments may also identify scene areas having important objects and include different important object depths in the principal depths. Captured images may be selected according to user input, aligned, and then combined using blending functions that favor only scene regions that are focused in particular captured images.

23 Claims, 3 Drawing Sheets

(51) Int. Cl.
*G02B 27/00* (2006.01)
*G06T 5/50* (2006.01)

(52) U.S. Cl.
CPC .. *G06T 2200/21* (2013.01); *G06T 2207/10148* (2013.01); *G06T 2207/20221* (2013.01)

(58) Field of Classification Search
USPC ........................................................ 348/345
See application file for complete search history.

(56) References Cited

U.S. PATENT DOCUMENTS

| | | | |
|---|---|---|---|
| 5,005,956 A | | 4/1991 | Kaneda et al. |
| 5,070,353 A | | 12/1991 | Komiya et al. |
| 5,144,357 A | | 9/1992 | Ishida et al. |
| 5,148,209 A | | 9/1992 | Subbarao |
| 5,151,609 A | | 9/1992 | Nakagawa et al. |
| 5,193,124 A | | 3/1993 | Subbarao |
| 5,231,443 A | | 7/1993 | Subbarao |
| 5,369,461 A | | 11/1994 | Hirasawa et al. |
| 5,475,429 A | | 12/1995 | Kodama |
| 5,793,900 A | | 8/1998 | Nourbakhsh et al. |
| 6,198,484 B1 | | 3/2001 | Kameyama |
| 6,269,197 B1 | | 7/2001 | Wallack |
| 7,389,042 B2 | | 6/2008 | Lin et al. |
| 7,623,726 B1* | 11/2009 | Georgiev ................ G06T 5/003 382/255 |
| 7,664,315 B2* | 2/2010 | Woodfill ............ G06K 9/00791 345/419 |
| 8,644,697 B1 | | 2/2014 | Tzur et al. |
| 8,654,234 B2* | 2/2014 | Hirsch .................. G06F 3/0325 348/211.1 |
| 8,724,013 B2* | 5/2014 | Safaee-Rad .............. G02B 7/38 348/349 |
| 2002/0018070 A1* | 2/2002 | Lanier .......................... 345/629 |
| 2003/0063815 A1 | 4/2003 | Watanabe |
| 2004/0257464 A1* | 12/2004 | Pandit .................. H04N 5/2251 348/373 |
| 2005/0218231 A1 | 10/2005 | Massieu |
| 2006/0181644 A1 | 8/2006 | De Haan |
| 2007/0018977 A1* | 1/2007 | Niem .................... G06T 7/0069 345/422 |
| 2008/0075444 A1 | 3/2008 | Subbarao et al. |
| 2008/0080852 A1* | 4/2008 | Chen ....................... G03B 35/02 396/324 |
| 2008/0095312 A1 | 4/2008 | Rodenburg et al. |
| 2008/0131019 A1* | 6/2008 | Ng ......................... G06T 5/001 382/255 |
| 2008/0211959 A1 | 9/2008 | Balram et al. |
| 2008/0297648 A1 | 12/2008 | Furuki et al. |
| 2009/0167930 A1* | 7/2009 | Safaee-Rad .............. G02B 7/38 348/347 |
| 2010/0053417 A1 | 3/2010 | Baxansky |
| 2010/0165152 A1* | 7/2010 | Lim ......................... G06T 5/50 348/240.99 |
| 2011/0007131 A1* | 1/2011 | Okada ................ H04N 13/0022 348/42 |
| 2011/0007176 A1* | 1/2011 | Hamano ............ H04N 5/23212 348/222.1 |
| 2011/0019056 A1* | 1/2011 | Hirsch .................. G06F 3/0325 348/333.01 |
| 2011/0025830 A1* | 2/2011 | McNamer ............ H04N 13/021 348/50 |
| 2011/0181770 A1 | 7/2011 | Rapaport et al. |
| 2011/0316968 A1* | 12/2011 | Taguchi ............. H04N 5/23238 348/36 |
| 2012/0019688 A1* | 1/2012 | Bugnariu ............. H04N 5/2621 348/239 |
| 2012/0070097 A1* | 3/2012 | Adams, Jr. ......... H04N 5/23212 382/255 |
| 2012/0076369 A1* | 3/2012 | Abramovich ...... G06K 9/00033 382/124 |
| 2012/0120283 A1* | 5/2012 | Capata ............... G06K 9/00255 348/241 |
| 2012/0200726 A1* | 8/2012 | Bugnariu .................. G06T 5/50 348/222.1 |
| 2013/0010067 A1* | 1/2013 | Veeraraghavan ...... G01B 11/22 348/46 |
| 2014/0267602 A1 | 9/2014 | Tzur et al. |

FOREIGN PATENT DOCUMENTS

| | | |
|---|---|---|
| KR | 20090037247 A | 4/2009 |
| WO | WO-2007024709 A2 | 3/2007 |
| WO | 2009073950 A1 | 6/2009 |

OTHER PUBLICATIONS

Asada, N. et al., "Depth from Blur by Zooming", Proc. Vision Interface (2001) pp. 165-172.

Bove Jr., V.M. et al., "Entropy-based Depth from Focus", J Optical Society of America (Apr. 1993) 10: 561-566.

Gokstorp, M., "Computing Depth from Out-of-focus Blur Using a Local Frequency Representation", Proc. Of the $12^{th}$ International Conference on Pattern Recognition—IAPR (1994) 1:153-158.

Nayar, S.K. et al., "Real-time Focus Range Sensor", IEEE Transactions on Pattern Analysis and Machine Intelligence (1996) 18(12):1186-1198.

Pentland, A.P., "A New Sense for Depth of Field", Proc. $9^{th}$ International Joint Conference on Artificial Intelligence—IJCAI (1985) pp. 988-994.

Sewlochan, Ray, "Iterative Depth from Defocus (I-DFD) Algorithms", The University of British Columbia, Apr. 1995 Thesis, 173 pages.

Subbarao, M., "Parallel Depth Recovery by Changing Camera Parameters", $2^{nd}$ International Conference on Computer Vision; (Dec. 1988), pp. 149-155.

Subbarao, M. et al., "Depth from Defocus and Rapid Autofocusing: A Practical Approach", International Proc. CVPR (1992) pp. 773-776.

Subbarao, M. et al., "Depth from Defocus: A Spatial Domain Approach", International Journal of Computer Vision (1994) 13(3):271-294.

Watanabe, M. et al., "Real-time Computation of Depth from Defocus", Proc. Of SPIE: Three Dimensional and Unconventional Imaging for Industrial Inspection and Metrology (1995-11) 2599, A-03.

Watanabe, M. et al., "Rational Filters for Passive Depth from Defocus", Internationl Journal of Computer Vision (1998-05) 27(3):203-225.

Xiong, Y. et al., "Depth from Focusing and Defocusing", Carnegie Mellon University, Mar. 1993, Technical Paper; 28 pages.

Ziou, D. et al., "Depth from Defocus Estimation in Spatial Domain", Computer Vision and Image Understanding (Feb. 2001) 81(2):143-165.

Pentland A.P., "A New Sense for Depth of Field", IEEE Transactions on Pattern Analysis and Machine Intelligence, vol. PAMI-9, No. 4, pp. 523-531, Jul. 1987.

* cited by examiner

IMAGE CAPTURE FOR LATER REFOCUSING OR FOCUS-MANIPULATION

CROSS REFERENCE TO RELATED APPLICATIONS

This application is based upon and claims the benefit under 35 U.S.C. 119(e) of commonly-assigned U.S. provisional application Ser. No. 61/525,102, filed Aug. 18, 2011, and entitled "Image Capture For Later Refocusing Or Focus-Manipulation," which is hereby incorporated by reference in its entirety. Commonly-assigned pending patent application U.S. Ser. No. 13/183,363 entitled "Method for Progressively Determining Depth from Defocused Images", filed on Jul. 14, 2011, is also hereby incorporated by reference in its entirety.

FIELD OF THE INVENTION

This patent application relates in general to refocusing an image after it is captured, and more specifically to creating a depth map during image capture preparation to enable directed image capture for subsequent refocusing processing.

BACKGROUND OF THE INVENTION

The problem of refocusing or focus manipulation after shooting an image is addressed. There are several scenarios where the need for refocusing is essential. The main scenario occurs when, during the shoot, the camera is focused on an object different than the one that the photographer had in mind. Moreover, even if the correct object was in focus, the photographer may want to change the focus position after the fact. Therefore, the existence of such an option provides the photographer with the freedom to choose the subject in focus after the shoot, even if the camera was focused on the intended subject.

Furthermore, focus manipulation may involve much more than just refocusing. Focus manipulation provides the ability to create images that a real camera cannot shoot. For example, it may be possible to allow focusing on some subjects and not focusing on others, even if the non-focused subjects are between the focused subjects.

Another option that focus manipulation may provide is the ability to create an all focus image, i.e., an image where all the objects are in focus.

One possible solution to focus manipulation issues is the so-called plenoptic camera which catches the entire light field of the scene and may be focused at any point after shooting the image. Plenoptic cameras however use non-standard camera optics and need sensors with a very large number of pixels.

Thus, a focus manipulation methodology using standard sensors and conventional camera optics is needed.

SUMMARY OF THE EMBODIMENTS

Systems, methods, and computer program products for capturing images for later refocusing and focus manipulation are disclosed and claimed herein.

As described more fully below, the apparatus and processes of the embodiments disclosed permit automatic focus manipulation. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

Describing the present invention in terms of an exemplary method embodiment, a processor-implemented method for capturing images for later refocusing may comprise estimating a distance map for a scene, determining a number of principal depths, capturing a set of images, each image focused at one of the principal depths, and, processing captured images to produce an output image.

The estimating may comprise computing depth from defocus, or may comprise acquiring images at different focus settings and finding the focus setting yielding a maximum spatial derivative for at least a portion of the scene. The estimating may comprise employing an external rangefinder.

The determining may comprise dividing the scene into a plurality of rectangles, wherein the depth map represents depths of the rectangles, with the depths corresponding to one of a predetermined number of focus steps, counting depth map entries having a specific focus step value, sorting counted depth map entries into a histogram, and selecting depths having the most depth map entries as the principal depths. The number of principal depths may be a fraction of the number of focus steps, with the fraction calculated according to a minimum number of focus steps from the histogram required to cover a predetermined percentage of the rectangles.

Alternately, the determining may comprise identifying scene areas having important objects, and including different important object depths in the principal depths. The important objects may include faces, pets, cars, people, and/or recognized faces of specific persons. The important object depths may be placed first in the principal depths. If the number of important objects is less than a predetermined threshold, depths corresponding to the highest histogram counts but not corresponding to important objects may be added to the principal depths. If the number of important objects is equal to or greater than the predetermined threshold, the number of important objects may determine the number of principal depths. The number of principal depths may be limited by available memory and/or the number of images that can be captured substantially simultaneously.

The processing may comprise selecting one image from the set according to user input or selection criteria. Alternately, the processing may comprise selecting a plurality of images from the set according to user input or selection criteria, aligning the selected images, and combining the selected images using blending functions. Each blending function preferably equals one in areas of a corresponding selected image that are focused, zero in areas of other selected images that are focused, and values between zero and one in other areas.

In a system embodiment, a processor executes instructions stored in a memory to estimate a distance map for a scene, determine a number of principal depths, capture a set of images, each image focused at one of the principal depths, and process captured images to produce an output image.

In a computer program product embodiment, a machine-readable medium tangibly embodies non-transitory program instructions thereon that, when executed by the machine, cause the machine to capture images for later refocusing by estimating a distance map for a scene, determining a number of principal depths, capturing a set of images, each image focused at one of the principal depths, and processing captured images to produce an output image.

DETAILED DESCRIPTION OF EXEMPLARY EMBODIMENTS

Embodiments of the present invention provide a new and patentably distinct methodology to manipulate the focus of captured images.

One potential solution is to perform focus bracketing, that is to acquire images at all possible focus positions and, after the images are acquired, choose one particular image or combine some of the images. There are clear limitations to this solution. The speed of image acquisition may limit the number of images that can be acquired, and each image requires some amount of storage capacity.

According to embodiments of the present invention therefore, during the preview period or at "half press" of the shutter button for example, the camera estimates the distance map of the imaged scene and finds a small number of principal depths. Then, at a "full press" of the shutter button, a burst of images focused at the principal depths is captured. The final processing, to achieve refocusing or focus manipulation, is based on the small number of captured images.

A major advantage of these embodiments is the use of a small number of images instead of using the entire range of focus positions. For example, the entire set of focus positions may include up to forty or more focus points, whereas in a typical scene there are perhaps four to six principal depths. The advantages of using a small number of images include:

1. Smaller storage space.
2. Smaller number of images to process.
3. Fewer processing artifacts, since the average delay between processed images is much smaller.

The delays between the various images are small, and therefore the various artifacts of processing the images are less noticeable, because new CMOS sensors are capable of capturing bursts of still images in a very fast fashion.

Figure 1:
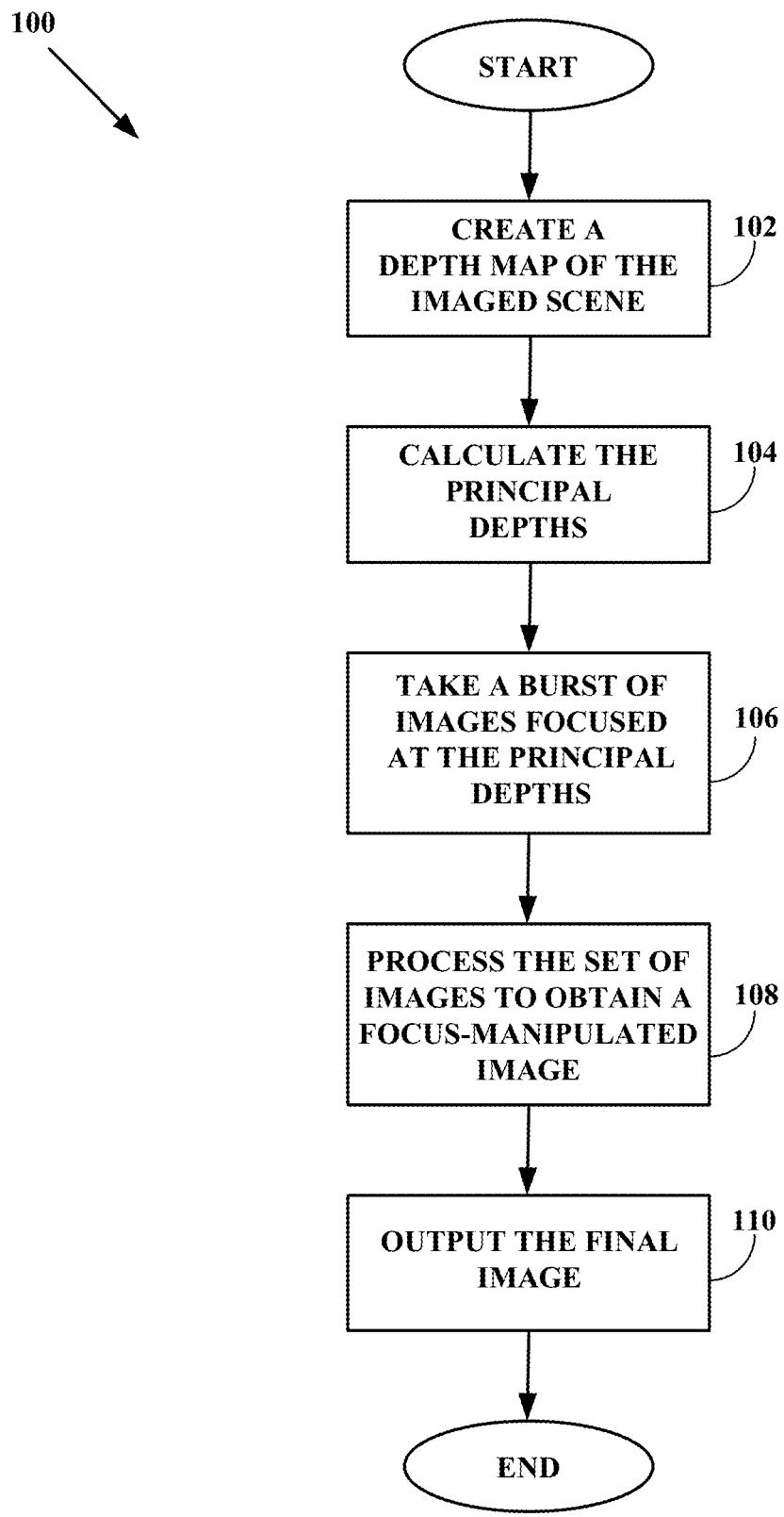
FIG. 1 depicts a flowchart according to a first embodiment.

Referring now to FIG. 1, the embodiments of the present invention perform the depicted procedure 100:

During "half press" or at preview time, create a depth map of the scene in step 102.
Based on the depth map, calculate a (small) number of principal depths in step 104.
In step 106, take a burst of images focused at the principal depths calculated in step 104.
Process the set of images captured in step 106 in order to obtain the final focus-manipulated image in step 108.
Output the final focus-manipulated image in step 110.

Creating a Depth Map During Half Press

A depth map may be created in several ways. One possible way is described in commonly-assigned pending patent application U.S. Ser. No. 13/183,363 entitled "Method for Progressively Determining Depth from Defocused Images" by M. Tzur and G. Rapaport, filed on Jul. 14, 2011, incorporated by reference above. Briefly, the depth map may be created by taking several preview images at some predefined focus positions and then calculating a depth map for the entire image based on the concept of "depth from defocus". The advantage of such a method is that there is no need to scan the entire range of focus positions in order to produce a depth map for the entire image.

Another way to create a depth map (previously mentioned) is to scan the entire range of focus positions, i.e., take preview images at all focus positions, and use the best focus position for the creation of a depth map. This is a so-called "depth from focus" method. With such methods, the best focus position is usually determined by finding the position of the maximum spatial derivative across all focus positions.

Additional ways for the creation of a depth map may use external rangefinder means that are not necessarily part of the camera focusing mechanism.

Calculating the Principal Depths

Given a depth map of the scene, we would like to calculate the principal depths in the scene. Principal depths are depths that belong to large or significant areas in the scene.

The following procedure may be used to find the principal depths based on large scene areas that belong to a specific depth. Assume that the scene is divided into M×N rectangles and the depth map represents the depth of each rectangle. Denote the depth by $D(x,y)$, where $x=1 \ldots M$ and $y=1 \ldots N$. Also assume that depth is represented by the corresponding focus step and that the number of focus steps is a finite number Q. Therefore, $1 \leq D(x,y) \leq Q$.

Embodiments may calculate a histogram function $H(q)$, for $1 \leq q \leq Q$, by counting the number of entries in $D(x,y)$ that have a specific q value. This may be achieved by the following pseudo code:

Init $H(q)=0$, for all $1 \leq q \leq Q$
Loop over all $x=1 \ldots M$ and $y=1 \ldots N$
$H(D(x,y))=H(D(x,y))+1$
End By sorting $H(q)$ from the highest count to the smallest count, we choose the P principal depths as being the q values for which $H(q)$ has the P highest values. In practice, due to various factors, we may instead locate the peaks of the histogram function $H(q)$ and choose the P principal depths as being the q values for which the peaks have the P highest values.

Figure 2:
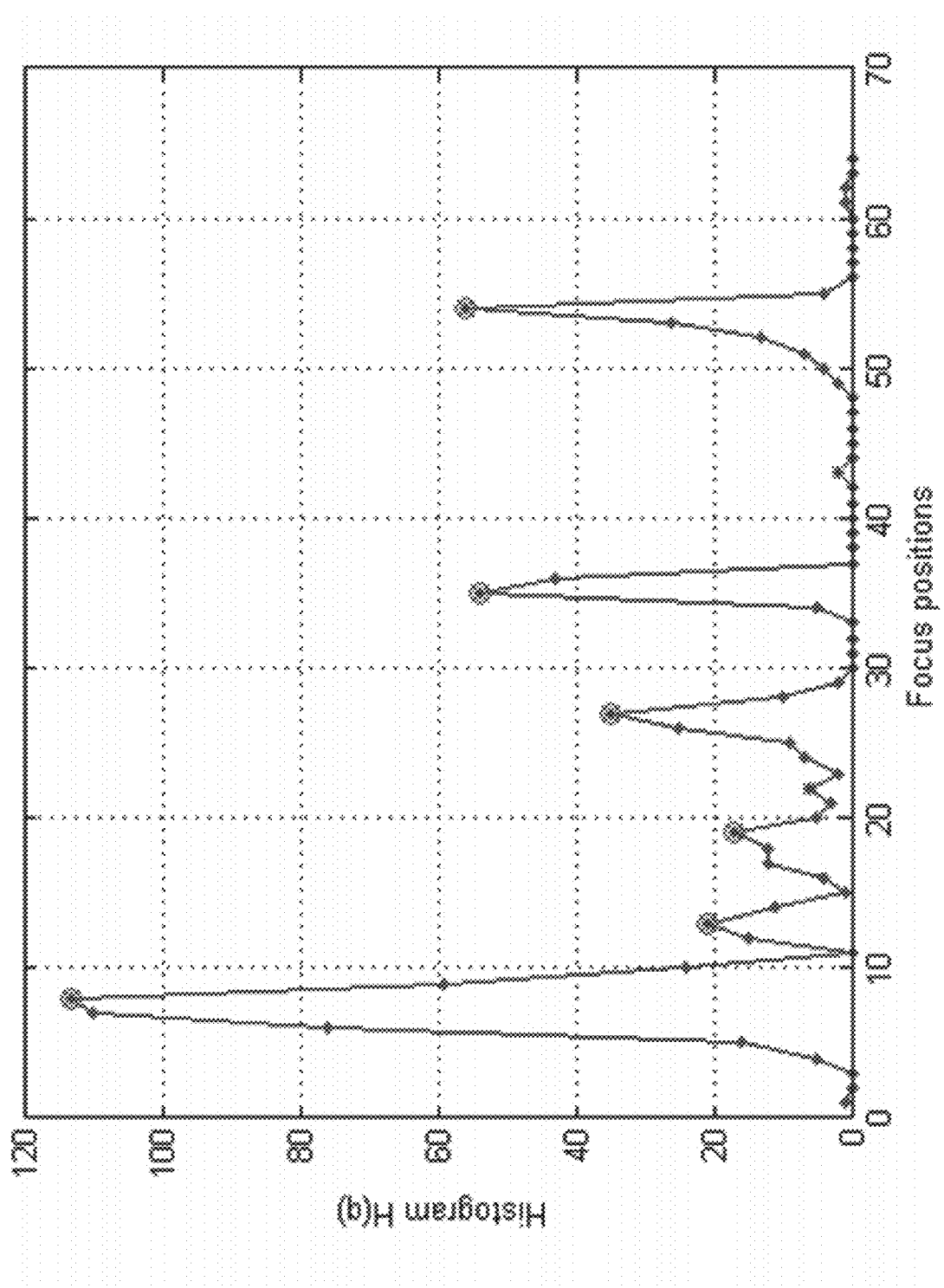
FIG. 2 depicts a histogram according to the first embodiment.

Referring now to FIG. 2, an exemplary histogram is provided indicating information regarding each of 64 focus steps that is used for locating six principal depths. In this way, the P principal depths that belong to the biggest areas in the image are selected. In this example, there are six principal depths, shown as circled points on FIG. 2. P may be defined a priori as a fraction of Q, or it may be calculated based on the histogram $H(q)$. For example, embodiments may choose P as the smallest number such that the sum of the P highest counts is higher or equal to half (or some other fraction) of the total number of rectangles in the depth map. That is, the smallest P such that $$\sum_{i=1}^{P} H(q_i) \geq 0.5 * M * N,$$

where $H(q_i)$ is the sorted histogram (highest value first).

A different consideration for finding the principal depths takes into account significant areas in the image. For example, significant areas could be areas where faces, or other important objects, are detected during preview. Other important objects could be pets, cars, humans, or faces of specific persons recognized during the preview. The depths of the important objects, such as faces, should be included first in the list of the principal depths.

Different limitations may lead to different schemes for calculating the principal depths. For example, in case of limited memory, the number of principal depths may be strictly limited by $P_0$ (since it may not be possible to capture more than $P_0$ images in one burst). Then, the scheme for finding the principal depths should be changed according to this constraint so that in all cases the number of principal depths will be smaller or equal to $P_0$.

Figure 3:
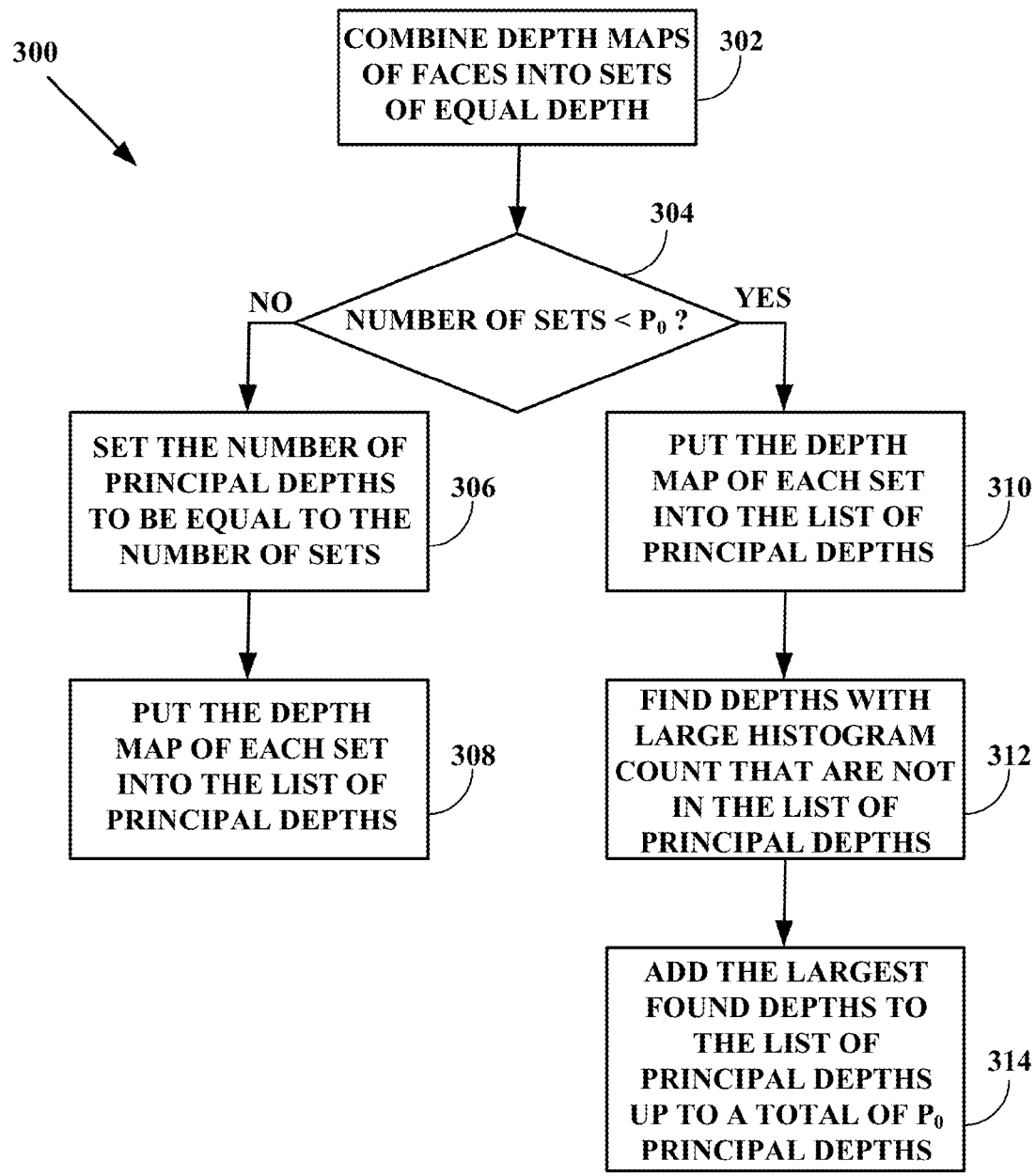
FIG. 3 depicts a flowchart according to a second embodiment.

Referring now to FIG. 3, an exemplary scheme 300 for finding principal depths when the significant areas are faces is shown. This scheme may be a subset of step 104 previously described. In this case, a number of depths $P_0$ that may be processed is chosen a priori by the user or according to some heuristics based on equipment limitations for example. The final number of principal depths is determined according to the number of detected faces and according to the histogram count H(q).

In step 302, depth maps of faces are combined into sets of equal depth. In step 304, a comparison is made between the number of such sets and the number of depths $P_0$ that may be processed. If the number of sets of detected important object depths is less than $P_0$, then depths that correspond to the highest histogram counts (and do not correspond to the important objects) may be added to the list of principal depths after the depths of each set, as described in steps 310-314. Further, if the number of detected important objects is more than (or equal to) $P_0$, then the number of principal depths may be determined by the number of important objects detected during preview, as described in steps 306-308.

Processing the Set of Images to Obtain a Focus-Manipulated Image

There are a number of examples for focus manipulation:

1. Refocusing on a Different Object.

In this case, only one image is chosen from the set of captured images. The user will go over all images and indicate which one is the desired one, for example. Alternately, one image may be chosen automatically, based on predetermined criteria, such as which image has a recognized face or other important object in focus, or which image has the highest depth map histogram count.

2. Refocusing on Several Objects.

In this case the user or a set of heuristics as described above will choose several objects (more than one) to be in focus. The system will then combine the corresponding images into one image such that the chosen objects will all be in focus. Such a combination might be non-realistic in the sense that there is no real camera that can produce such an image. The combination process might require analysis of the images in order to align the images. After alignment, the images may be combined by using a blending function which equals one in the area where the image is focused, equals zero in the areas where other images are focused, and in-between values (larger than zero and less than one) in other areas.

For example, assume that the user chooses two images where each image has a different object in focus. Also assume that the two images $I_1(x,y)$, $I_2(x,y)$ are already aligned. Then, the final image will be $$I(x,y)=a_1(x,y)*I_1(x,y)+a_2(x,y)*I_2(x,y),$$

where $a_1(x,y)$ and $a_2(x,y)$ are blending functions such that $0 \leq a_1(x,y), a_2(x,y) \leq 1$. Further, $a_1(x,y)$ equals 1 in the area where the object in $I_1(x,y)$ is focused and equals zero in the area where the object in $I_2(x,y)$ is focused. In the other areas the value of $a_1(x,y)$ gradually changes from 1 to 0 and vice versa. Similar logic is true for $a_2(x,y)$ with regard to $I_2(x,y)$.

3. All Objects in Focus

In this case all images will be used and the final image will be:

$$I(x, y) = \sum_{i=1}^{P} a_i(x, y) I_i(x, y),$$

where $I_i(x,y)$ are the aligned images and $a_i(x,y)$ are the blending functions.

The resulting output may comprise an output image or an output video clip based on all or part of the processed images.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits. Embodiments may also encompass integrated circuitry including circuit elements capable of performing specific system operations.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A processor-implemented method for capturing images for later refocusing, comprising:
    estimating a depth map for a scene;
    determining a number of principal depths via selecting a plurality of depths having the largest areas in the depth map as the principal depths;
    capturing a set of images, each image focused at one of the principal depths; and
    processing captured images to produce an output image.

2. The method of claim 1, wherein the estimating comprises depth from defocus.

3. The method of claim 1, wherein the estimating comprises acquiring images at different focus settings and finding the focus setting yielding a maximum spatial derivative for at least a portion of the scene.

4. The method of claim 1, wherein the estimating comprises employing an external rangefinder.

5. The method of claim 1, wherein the determining further comprises:
    dividing the scene into a plurality of rectangles, wherein the depth map represents depths of the rectangles, the depths corresponding to one of a predetermined number of focus steps; and
    selecting depths having the most depth map entries as the principal depths.

6. The method of claim 1, wherein the determining further comprises:
    dividing the scene into a plurality of rectangles, wherein the depth map represents depths of the rectangles, the depths corresponding to one of a predetermined number of focus steps;
    counting depth map entries having a specific focus step value;
    sorting counted depth map entries into a histogram; and
    selecting depths having the most depth map entries as the principal depths.

7. The method of claim 6, wherein the number of principal depths is a fraction of the number of focus steps, the fraction calculated according to a minimum number of focus steps from the histogram required to cover a predetermined percentage of the rectangles.

8. The method of claim 1, wherein the determining further comprises:
    identifying scene areas having important objects; and
    including different important object depths in the principal depths.

9. The method of claim 8, wherein the important objects include at least one of faces, pets, cars, people, and recognized faces of specific persons.

10. The method of claim 8, wherein the important object depths are placed first in the principal depths.

11. The method of claim 10, further comprising, if the number of important objects is less than a predetermined number, adding depths corresponding to highest histogram counts but not corresponding to important objects to the principal depths.

12. The method of claim 8, further comprising, if the number of important objects is at least a predetermined number, the number of important objects determines the number of principal depths.

13. The method of claim 8, wherein the number of principal depths is limited by at least one of available memory and the number of images that can be captured substantially simultaneously.

14. The method of claim 1, wherein the processing comprises selecting one image from the set according to at least one of user input and automated selection criteria.

15. The method of claim 14, wherein the selection criteria include at least one of which image has a recognized face in focus, and which image has the highest depth map histogram count.

16. The method of claim 1, wherein the processing comprises:
    selecting a plurality of images from the set according to at least one of user input and automated selection criteria;
    aligning the selected images; and
    combining the selected images using blending functions.

17. The method of claim 16, wherein each blending function equals one in areas of a corresponding selected image that are focused, zero in areas of other selected images that are focused, and values between zero and one in other areas.

18. The method of claim 16, wherein the plurality includes all the captured images.

19. The method of claim 1, further comprising generating an output video clip based on at least part of the processed images.

20. A computer program product comprising a machine-readable medium tangibly embodying non-transitory program instructions thereon that, when executed by the machine, cause the machine to capture images for later refocusing by:
    estimating a depth map for a scene;
    determining a number of principal depths via selecting a plurality of depths having the largest areas in the depth map as the principal depths;
    capturing a set of images, each image focused at one of the principal depths; and
    processing captured images to produce an output image.

21. A system for capturing images for later refocusing, comprising:
    means for estimating a depth map for a scene;
    means for determining a number of principal depths, wherein the means for determining comprises means for selecting a plurality of depths having the largest areas in the depth map as the principal depths;
    means for capturing a set of images, each image focused at one of the principal depths; and
    means for processing captured images to produce an output image.

22. A system for capturing images for later refocusing, comprising:
- a processor; and
- a memory that stores instructions, the processor instruction execution causing the processor to:
- estimate a depth map for a scene;
- determine a number of principal depths via selecting a plurality of depths having the largest areas in the depth map as the principal depths;
- capture a set of images, each image focused at one of the principal depths; and
- process captured images to produce an output image.

23. An integrated circuit for capturing images for later refocusing, comprising:
- a first circuit element for estimating a depth map for a scene;
- a second circuit element for determining a number of principal depths via selecting a plurality of depths having the largest areas in the depth map as the principal depths;
- a third circuit element for capturing a set of images, each image focused at one of the principal depths; and
- a fourth circuit element for processing captured images to produce an output image.

* * * * *